(12) United States Patent
Beckel et al.

(10) Patent No.: US 7,849,670 B2
(45) Date of Patent: Dec. 14, 2010

(54) PROPULSION SYSTEM WITH INTEGRATED ROCKET ACCELERATOR

(75) Inventors: Stephen A. Beckel, Palm Beach Gardens, FL (US); James D. Blevins, Palm Beach Gardens, FL (US); Thomas Verdi, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1632 days.

(21) Appl. No.: 10/414,321

(22) Filed: Apr. 15, 2003

(65) Prior Publication Data

US 2009/0057494 A1  Mar. 5, 2009

(51) Int. Cl.
*F02K 7/18* (2006.01)
*F02K 1/00* (2006.01)

(52) U.S. Cl. .............................. 60/225; 60/767; 60/770

(58) Field of Classification Search .................. 60/767, 60/768, 269, 204, 769, 770, 225, 244, 245, 60/224
See application file for complete search history.

(56) References Cited

U.S. PATENT DOCUMENTS

| | | | | |
|---|---|---|---|---|
| 4,628,688 A | * | 12/1986 | Keirsey | 60/251 |
| 5,159,809 A | * | 11/1992 | Cias et al. | 60/225 |
| 5,223,651 A | * | 6/1993 | Sticklet et al. | 60/218 |
| 6,155,041 A | * | 12/2000 | Bouchez | 60/270.1 |

* cited by examiner

*Primary Examiner*—Timothy D Collins
*Assistant Examiner*—Joseph W Sanderson
(74) *Attorney, Agent, or Firm*—Bachman & LaPointe, P.C.

(57) ABSTRACT

The present invention relates to a propulsion system for a vehicle. The propulsion system has an airframe integrated hydrocarbon fueled airbreathing engine, such as a ramjet or a scramjet. The propulsion system further has at least one rocket positioned so as to use the aft body contour of the vehicle directly for flow expansion. In a preferred embodiment, a plurality of rockets are arrayed across the width of the engine nozzle.

19 Claims, 2 Drawing Sheets

US 7,849,670 B2

PROPULSION SYSTEM WITH INTEGRATED ROCKET ACCELERATOR

BACKGROUND OF THE INVENTION

The present invention relates to an improved propulsion system for a vehicle, such as an aircraft, with the propulsion system comprising an engine having an integrated hydrocarbon propellant rocket system positioned with respect to the engine so as to take advantage of the aft-body contour as a high area ratio self-compensating nozzle.

Existing airframe-integrated hydrocarbon fueled ramjet/scramjet engine concepts are designed to operate at flight velocities beginning at about Mach 4 and provide vehicle acceleration and cruise capabilities to as high as Mach 8. To provide the initial acceleration or boost to Mach 4, a variety of propulsion systems have been proposed including external solid or liquid rockets as well as ejector ramjets also referred to as Rocket Based Combined Cycle (RBCC) engines.

External rockets, although capable of providing high thrust levels beneficial to rapid acceleration and minimizing fuel burn, lack integrated vehicle efficiency or effective specific impulse (thrust minus drag divided by propellant flow rate). This is due to the fact that the airbreathing flowpath is not performing optimally during the low Mach number trajectory phase with inherent large aft facing areas contributing to large vehicle base drag.

RBCC systems, such as that shown in FIG. 1, by contrast, rely on relatively small rockets 10 located at or near the throat 12 of a scramjet engine 14 to entrain and pump airflow through the scramjet flowpath 16. The scramjet engine 14 typically has an inlet 18, the engine throat 12, a cowl 20, and a nozzle 22. Each rocket 10 comprises an ejector rocket with a contoured nozzle 24 and a piloting injector 26. Depending on the stoichiometry of the rockets 10 and the efficiency of air entrainment, fuel may be added downstream of the rockets 10 to provide additional afterburning. Although base drag is reduced over external rocket integrations, the scramjet nozzle pressure ratio is typically too low for the nozzle to pressurize appreciably resulting in the requirement for other base or external burning means to reduce drag. Thrust levels are fairly constrained as the rocket exhaust nozzles must be small enough not to adversely affect the scramjet engine performance via excessive throat blockage, form, and base drag within the flowpath.

SUMMARY OF THE INVENTION

Accordingly, it is an object of the present invention to provide an improved propulsion system which provides a more efficient vehicle-level solution to a boost phase by combining the ability to provide high thrust with moderate efficiency and low vehicle base drag without compromising the high speed propulsion system performance.

It is a further object of the present invention to provide a propulsion system which combines an airframe-integrated, hydrocarbon-fueled airbreathing engine with a hydrocarbon propellant rocket which is positioned in such a manner as to take advantage of the aft-body contour of the vehicle as a high area ratio self-compensating nozzle.

The foregoing objects are attained by the propulsion system of the present invention.

In accordance with the present invention, a propulsion system for a vehicle broadly comprises an airframe-integrated, hydrocarbon fueled airbreathing engine and at least one hydrocarbon propellant rocket positioned so as to use the aft-body contour of the vehicle directly for flow expansion. The engine may be a ramjet engine or a scramjet engine.

Other details of the propulsion system with integrated rocket accelerator, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
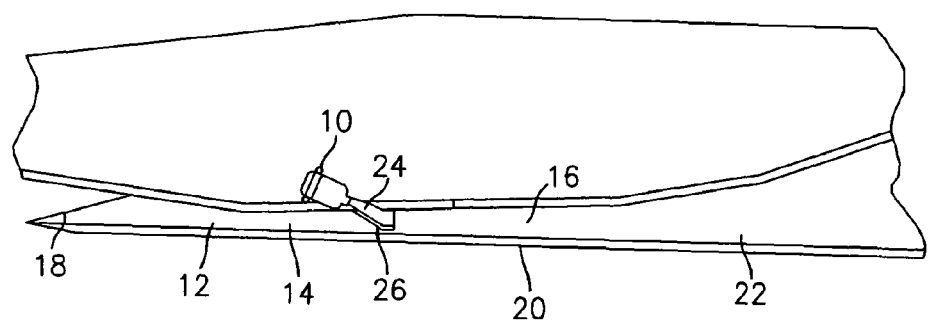
FIG. 1 is a schematic representation of a prior art rocket based combined cycle engine.
Figure 2:
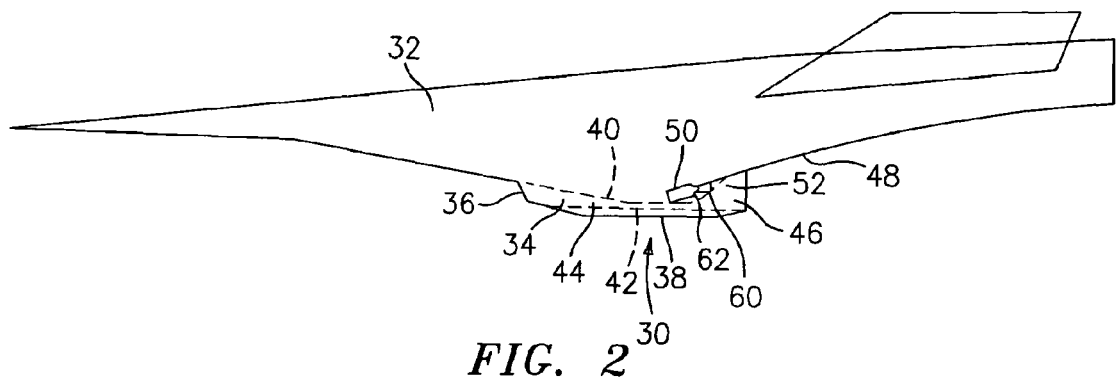
FIG. 2 is a schematic representation of a propulsion system for an aircraft vehicle in accordance with the present invention.

FIG. 2 illustrates a propulsion system 30 incorporated into a vehicle 32. The propulsion system 30 includes an airframe-integrated, hydrocarbon fueled, airbreathing engine 34 such as a ramjet or a scramjet. The engine 34 has an inlet 36, an outer cowl 38, an interior wall structure 40, and a flow path 42 determined by the contour of the interior wall structure 40 and the outer cowl 38. The flow path 42 includes a throat region 44, and a nozzle 46. The nozzle 46 is in part formed by the contour of an aft-body 48.

Figure 5:
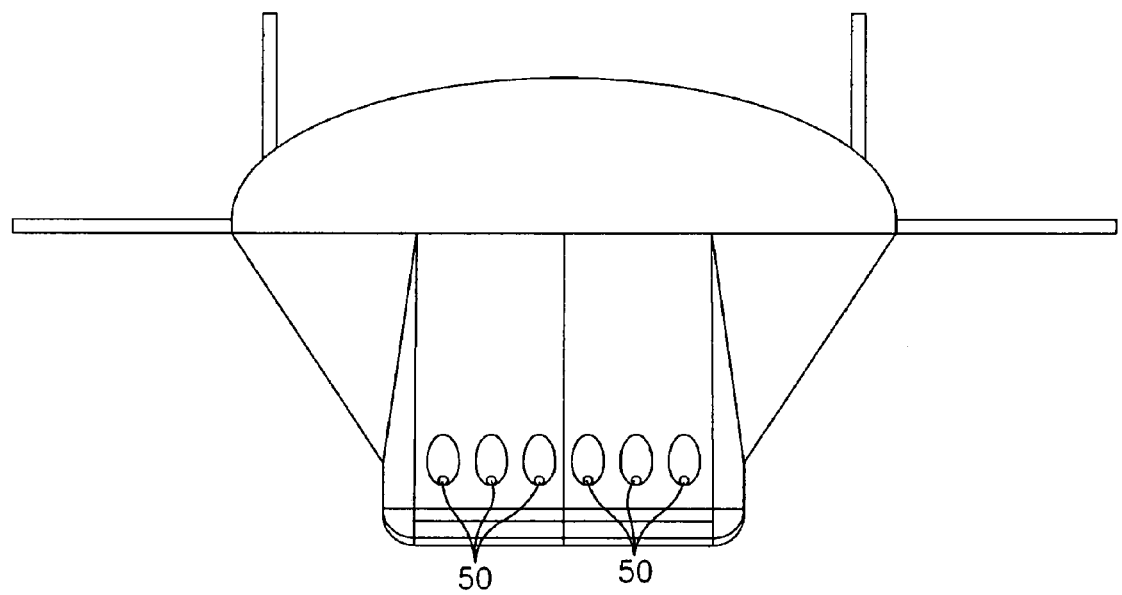
FIG. 5 is a rear view of the nozzle of the engine showing an array of rockets across the width of the nozzle.

In accordance with the present invention, as shown in FIG. 2, one or more hydrocarbon propellant rockets 50 are incorporated into the propulsion system 30 in such a manner as to take advantage of the contour of the aft-body 48 as a high area ratio self-compensating nozzle. While only one rocket 50 is shown in FIG. 2, there may be in actuality a plurality of rockets 50 transversely aligned as shown in FIG. 5 across the width of the nozzle 46. As shown in FIG. 2, each of the propellant rockets 50 may be situated at the entrance to the nozzle 46. By locating the propellant rocket(s) 50 in this position, the constraints associated with the engine throat blockage are eliminated, thus allowing the use of larger rockets and resultant high thrust levels without compromising the high speed engine performance. The rocket(s) 50 are preferably situated so as to use the aft-body contour 48 of the vehicle directly for flow expansion. Further, the rocket(s) 50 may be sized to provide pressure ratios sufficient to ensure nozzle pressurization, thus eliminating base drag. In the propulsion system of the present invention, the rocket system specific impulse is on par with typical altitude compensating external rocket designs but the effective specific impulse will be higher due to the large base drag reduction.

As proposed in FIG. 2, the rocket(s) 50 may be situated in the flow path 42 near the beginning of the nozzle 46. In this position, the rocket internal-nozzle exhaust flow is preferably directed such that it begins flowing in a direction which is tangential to the nozzle surface 52 formed by the aft-body contour 48. This allows the exhaust flow to be physically unbounded on one side. Ambient conditions dictate the position of this boundary and permit the exhaust flow to be ideally expanded over a great range of ambient conditions (operating altitudes and Mach numbers). The rocket exhaust may be introduced via nozzle(s) 60 which are located internally of the vehicle airframe. The nozzle(s) may have a shape selected from the group consisting of rectangular, square and round exit plane shapes. Likewise, each of the rockets 50 will have a throat which may have a shape selected from the group consisting of rectangular, square and round shapes.

Figure 3:
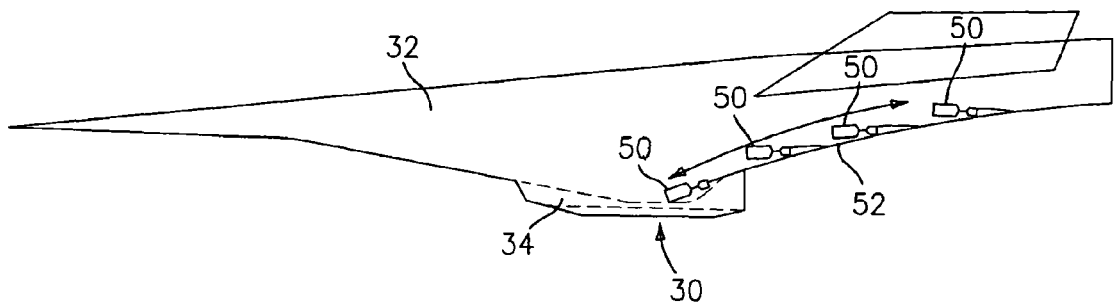
FIG. 3 is a schematic representation of locations for a propellant rocket used in the propulsion system of the present invention.

As shown in FIG. 3, the introduction of the rocket exhaust gases may take place anywhere along the external nozzle surface 52 formed by the aft-body contour 48. The position of the rocket(s) 50 in a particular propulsion system 30 may be dictated by the trajectory of the vehicle 32 such that optimum integrated performance is achieved.

Figure 4:
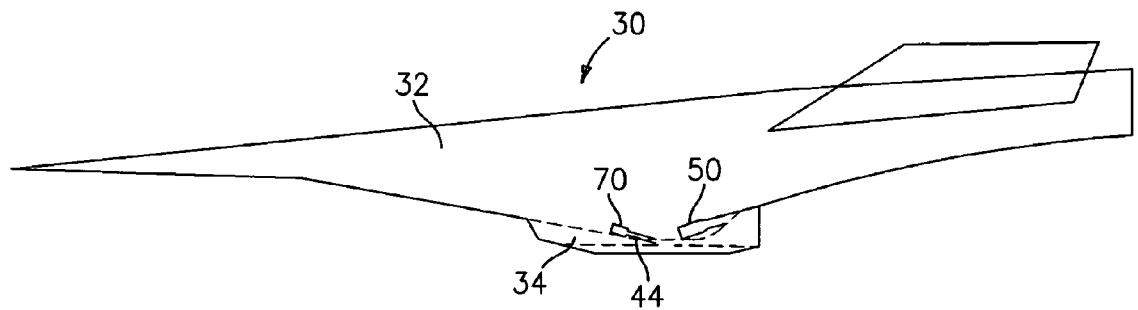
FIG. 4 is a schematic representation of an alternative embodiment of a propulsion system for an aircraft vehicle in accordance with the present invention.

As shown in FIG. 4, a variation on the operation of the concept is to simultaneously operate the airbreathing flowpath of the engine 34 as an ejector ramjet during the low Mach number phase of the trajectory of the vehicle 32. This may be accomplished by adding hydrocarbon propellant rocket drive motors 70 to the airbreathing flowpath throat region 44, or, if a monopropellant (such as hydrogen peroxide) is utilized, the rocket driver motors 70 may be operated on the monopropellant alone.

The engine 34 may have an aft-body and the rocket(s) may be positioned anywhere along the length of the aft-body so as to optimize vehicle performance.

The propulsion system of the present is novel because it utilizes the integration of the rocket(s) to take advantage of the existing flowpath surfaces to form a self-compensating nozzle. This provides a more efficient vehicle-level solution to the boost phase by combining the ability to provide high thrust with moderate efficiency and low vehicle base drag without compromising the high speed engine performance, particularly when the engine is operating as a scramjet engine.

Other benefits of the propulsion system of the present invention is the elimination of external burning along the external nozzle surface which was needed to reduce nozzle base drag. This is especially beneficial for hydrocarbon applications as flame stability will be much more challenging than previously proposed hydrogen-fueled concepts. The benefits also include elimination of the requirement for an upturned nozzle flap to keep internal nozzle from overexpanding and elimination of base burning along the external nozzle flap surface which was needed to reduce base drag on the upturned nozzle flap. Other benefits include reduction in required scramjet engine variable geometry and additional performance potential of airbreathing flowpath burning during boost in the form of a reduced contraction inlet allowing ramjet operation at Mach numbers lower than typical without this treatment.

It is apparent that there has been provided in accordance with the present invention a propulsion system with an integrated rocket accelerator which fully satisfies the objects, means, and advantages set forth hereinbefore. While the present invention has been described in the context of specific embodiments thereof, other alternatives, modifications, and variations will become apparent to those skilled in the art having read the foregoing detailed description. Accordingly, it is intended to embrace those alternatives, modifications, and variations as fall within the broad scope of the appended claims.

What is claimed is:

1. A propulsion system for a vehicle having an aft-body contour, said propulsion system comprising:
   an airframe-integrated hydrocarbon-fueled airbreathing engine; and
   at least one rocket positioned so as to use the aft-body contour of the vehicle directly for flow expansion, said at least one rocket being sized to provide pressure ratios sufficient to ensure nozzle pressurization and elimination of base drag.

2. The propulsion system according to claim 1, wherein said engine comprises a ramjet engine.

3. The propulsion system according to claim 1, wherein said engine comprises a scramjet engine.

4. The propulsion system according to claim 1, wherein said engine has a nozzle with an entrance and said at least one rocket is positioned at said nozzle entrance.

5. The propulsion system according to claim 1, wherein said engine has a nozzle and said at least one rocket is positioned so that rocket exhaust flow begins flowing in a direction tangential to a surface of said nozzle.

6. The propulsion system according to claim 5, wherein said at least one rocket has an internal nozzle and said nozzle has a plane shape selected from the group consisting of rectangular, square and round.

7. The propulsion system according to claim 5, wherein said at least one rocket has a throat and said throat has a shape selected from the group consisting of rectangular, square and round.

8. The propulsion system according to claim 5, wherein said rocket comprises a hydrogen/oxidizer rocket.

9. The propulsion system according to claim 5, wherein said rocket comprises a monopropellant rocket.

10. The propulsion system according to claim 1, further comprising said engine having a throat region and a rocket driver motor positioned so as to inject motor exhaust into said throat region.

11. The propulsion system according to claim 10, wherein said rocket motor driver comprises a hydrocarbon propellant rocket motor driver.

12. The propulsion system according to claim 10, wherein said rocket motor driver comprises a monopropellant rocket motor driver.

13. The propulsion system according to claim 1, further comprising said engine having a nozzle and said at least one rocket includes a plurality of rockets arrayed across a width of said nozzle.

14. The propulsion system according to claim 1, wherein said engine has an aft-body and said at least one rocket is positioned along a length of said aft-body so as to optimize vehicle performance.

15. A propulsion system according to claim 1, further comprising said engine having a nozzle and said at least one rocket includes a plurality of rockets transversely arrayed across a width of said nozzle.

16. A vehicle comprising:
   a fuselage with a contoured aft body portion;
   an airframe-integrated hydrocarbon-fueled airbreathing engine;
   at least one rocket positioned relative to said contoured aft body portion so that exhaust flow from said at least one rocket flows in a direction tangential to said contoured aft body portion and said contoured aft body portion is used directly for flow expansion;
   air flowing through said engine and exiting through a nozzle which is formed in part by said contoured aft body portion; and
   said at least one rocket being positioned near a beginning of said nozzle so that rocket internal-nozzle exhaust flow is directed such that said exhaust flow flows in a direction tangential to a nozzle surface formed by said aft body contour.

17. A vehicle according to claim 16, wherein said exhaust flow is physically unbounded on one side.

18. A vehicle according to claim 16, wherein said at least one rocket includes a plurality of rockets positioned along said contoured aft body.

19. A vehicle according to claim 18, wherein said rockets are spaced from each other and wherein a forwardmost one of said rockets is located adjacent said engine nozzle and a most rearward one of said rockets is located downstream of said forwardmost rocket.

* * * * *